United States Patent [19]

Chang

[11] Patent Number: 4,935,397

[45] Date of Patent: * Jun. 19, 1990

[54] SUPPORTED METALLOCENE-ALUMOXANE CATALYST FOR HIGH PRESSURE POLYMERIZATION OF OLEFINS AND A METHOD OF PREPARING AND USING THE SAME

[75] Inventor: Main Chang, Houston, Tex.

[73] Assignee: Exxon Chemical Patents Inc., Linden, N.J.

[*] Notice: The portion of the term of this patent subsequent to Feb. 28, 2006 has been disclaimed.

[21] Appl. No.: 250,293

[22] Filed: Sep. 28, 1988

[51] Int. Cl.$^5$ ............................. C08F 4/64; C08F 4/68
[52] U.S. Cl. ................................. 502/117; 502/111; 502/120; 526/129
[58] Field of Search ............... 502/104, 107, 111, 120, 502/117; 556/179

[56] References Cited

U.S. PATENT DOCUMENTS 4,808,561 2/1989 Weuborn .................. 502/120 X

FOREIGN PATENT DOCUMENTS 170059 5/1986 European Pat. Off. ............ 502/120

Primary Examiner—Patrick P. Garvin
Attorney, Agent, or Firm—M. B. Kurtzman

[57] ABSTRACT

This invention relates to a process for preparing a supported metallocene alumoxane catalyst for use in the high pressure polymerization of olefins. The invention particularly relates to the use of silica gel having a particle size less than 10 microns containing from about 5 to about 20 per cent by weight absorbed water as the catalyst support material. It has been found that such silica gel may be safely added to an aluminum trialkyl solution to form by direct reaction with the adsorbed water content of the silica gel catalyst support material the alumoxane component of the catalyst system. An alumoxane coated silica gel is formed to which a metallocene may be added and the resulting material dried to free flowing powder. The dried free flowing powder may then be used as a catalyst for high pressure polymerization of olefins.

12 Claims, No Drawings

SUPPORTED METALLOCENE-ALUMOXANE CATALYST FOR HIGH PRESSURE POLYMERIZATION OF OLEFINS AND A METHOD OF PREPARING AND USING THE SAME

This invention relates to a supported metallocene alumoxane catalyst and a method of preparing and using the same in the high pressure polymerization of olefins. The invention particularly relates to a supported metallocene-alumoxane catalyst derived from a silica gel having an average particle size less than $10\mu$ and containing from about 8 to about 15 percent by weight adsorbed water. Such silica gel may be added to an aluminum trialkyl solution to form, by direct reaction with the adsorbed water content of the silica gel catalyst support material, the alumoxane component of the catalyst system. A metallocene may then be added to the alumoxane coated silica gel and the resulting material dried to a free flowing powder. The dry free flowing powder having a particle size less than $10\mu$ can be successfully fed through the catalyst feeding pump of reactors normally employed for the polymerization of olefins at high pressures.

BACKGROUND OF THE INVENTION

The prior art has long recognized the usefulness of catalyst systems comprising a metallocene and an aluminum alkyl in the polymerization of olefins at pressures lower than 20 bar. In the past decade catalyst systems comprising metallocenes such as bis-(cyclopentadienyl) titanium or zirconium dialkyls and an aluminum alkyl/water cocatalyst component have been disclosed for the polymerization of ethylene. For example, European Patent Application No. 0035242 discloses a gas phase polymerization process for preparing ethylene and atactic propylene polymers in the presence of a cyclopentadienyl transition metal salt and an alumoxane. See further U.S. Pat. No. 4,431,788 and German Pat. No. 3,240,382, herein incorporated by reference.

While such metallocene alumoxane catalysts exhibit high activity and efficiency for the polymerization of olefins, three factors have prohibited their commercial use as olefinic polymerization catalysts under high pressures and temperatures.

1. Hazard of Alumoxane Production. An alumoxane is formed from the highly rapid and exothermic reaction of an aluminum alkyl with water. Because of the extreme violence of the reaction the alumoxane cocatalyst component has previously been separately prepared by one of two general methods. In one method, referred to as the "wet solvent production method", extremely finely divided water, such as in the form of a humid solvent, is added to a solution of aluminum alkyl in toluene or other aromatic hydrocarbon. The production of an alumoxane by this process requires use of explosion-proof equipment and very close control of the reaction conditions in order to reduce potential fire and explosion hazards. The second method is often referred to as the "hydrated salt method". In this process, an aluminum alkyl is reacted with a hydrated salt, such as hydrated copper sulfate. A slurry of finely divided copper sulfate pentahydrate and toluene is formed and mantled under an inert gas. Aluminum alkyl is then slowly added to the slurry with stirring and the reaction mixture is maintained at room temperature for 24 to 48 hours during which a slow hydrolysis occurs by which alumoxane is produced. Although the production of alumoxane by the hydrated salt method significantly reduces the explosion and fire hazard inherent in the wet solvent production method, production of the alumoxane must nevertheless be carried out separately. The process is also slow and produces hazardous wastes that create disposal problems. Further, before the alumoxane can be used for the production of an active catalyst complex the hydrated salt reagent must be separated from the alumoxane to prevent it from becoming entrained in the catalyst complex and thus contaminating any polymer produced therewith.

2. High Cost. Due to the hazard of producing alumoxane, the cost of alumoxane is very high, which makes it less attractive for commercial application.

3. Toxicity of Alumoxane/Aromatic Solution. Methylalumoxane is more soluble in polar hydrocarbon solvent such as aromatic hydrocarbons. Toluene is the most commonly used solvent for alumoxane. The presence of aromatic residues in polymer products is a health concern which mitigates against the commercial application of alumoxane/toluene solutions in the olefin polymerization.

It would be most desirable to devise an economical procedure whereby a metallocene-alumoxane catalyst useful for high temperature and/or high pressure polymerization procedures could be safely and economically produced. Desirably the catalyst should be one prepared without the necessity for using an aromatic solvent and instead can be readily prepared in non-toxic aliphatic hydrocarbon solvents such as isopentane, hexane, heptane, octane and the like.

SUMMARY OF THE INVENTION

This invention is drawn to a supported metallocene-alumoxane catalyst complex for the polymerization of olefins under high pressures and temperatures. The complex utilizes as the catalyst support material silica particles having an average particle size of less than $10\mu$, a surface area in the range of about 10 m$^2$/g to about 700 m$^2$/g, preferably about 100–500 m$^2$/g and desirably about 200–400 m$^2$/g, a pore volume of about 3 to about 0.5 cc/g and preferably 2–1 cc/g, and an adsorbed water content of from about 5 to about 20 weight percent, preferably from about 8 to about 15 weight percent. The silica gel supported metallocene alumoxane catalyst can be economically and safely prepared by adding the undehydrated silica gel to a stirred hydrocarbon solution of aluminum trialkyl in an amount sufficient to provide a mole ratio of aluminum trialkyl to water of from about 0.5 to about 1.5, preferably 0.8 to about 1.2; thereafter adding to this stirred solution a metallocene in an amount sufficient to provide an aluminum to transitional metal ratio of from about 1000 to 1, preferably from about 500 to 10, most preferably from about 100 to about 20; removing the solvent and drying the solids to a free flowing powder. Drying can be obtained by modest heating or vacuum.

The dried free flowing powder comprises a metallocene alumoxane catalyst complex adsorbed upon the surface of the silica gel support particles. The supported catalyst complex has an activity sufficient for use as a high pressure and/or high temperature polymerization catalyst for olefins.

It has been found that the catalyst complex of this invention exhibits a low settling rate and thereby can be successfully fed through a high pressure pump of the reactor without clogging it. Further, the molecular weight of the desired polymeric product can be controlled when the catalyst complex of this invention is employed by merely monitoring the temperature in the reactor.

DETAILED DESCRIPTION OF THE PREFERRED EMBODIMENTS

The present invention is directed towards a supported catalyst system for use in the high pressure and/or high temperature polymerization of olefins, particularly the polymerization of ethylene to high molecular weight polyethylenes such as linear low density polyethylene (LLDPE), high density polyethylene (HDPE), very low density polyethylene (VLDPE) and lower molecular weight materials such as polyethylene waxes. The polymers so produced are intended for fabrication into articles by extrusion, injection molding, thermoforming, rotational molding, and the like.

The active catalyst complex comprises a metallocene and an alumoxane formed onto the surface of a silica gel support material. Alumoxanes are oligomeric aluminum compounds represented by the general formula $(R-Al-O)_y$ which is believed to be a cyclic compound and $R(R-Al-O-)_y AlR_2$ which is a linear compound. In the general formula, "R" is a $C_1-C_{10}$ alkyl group such as, for example, methyl, ethyl, propyl, butyl, and pentyl and "y" is an integer from 2 to about 30 and represents the degree of oligomerization of the alumoxane. Preferably, "R" is methyl and "y" is about 4 to about 25 and most preferably 6–25.

Generally, in the preparation of alumoxanes from, for example, the reaction of aluminum trimethyl and water, a mixture of linear and cyclic compounds is obtained. Generally, an alumoxane having a higher degree of oligomerization will, for a given metallocene, produce a catalyst complex of higher activity than will an alumoxane having a lower degree of oligomerization. Hence, the procedure by which alumoxane is produced by direct reaction of an aluminum trialkyl with an undehydrated silica gel should insure the conversion of the bulk quantity of the aluminum trialkyl to an alumoxane having a high degree of oligomerization. In accordance with this invention the desired degree of oligomerization is obtained by the order of addition of reactants as described hereinafter.

The metallocene may be any of the organometallic coordination compounds obtained as a cyclopentadienyl derivative of a transition metal. Metallocenes which are useful for preparing an active catalytic complex according to the process of this invention are the mono-, bi- and tri- cyclopentadienyl or substituted cyclopentadienyl metal compounds and most preferably, bicyclopentadienyl compounds. The metallocenes particularly useful in this invention are represented by the general formulas:

$(Cp)_m MR_n X_q$   I.

wherein Cp is a cyclopentadienyl ring, M is a Group 4b or 5b transition metal and preferably a Group 4b transition metal (Periodic Table CRS Handbook of Chemistry and Physics, The Chemical Rubber Co. Cleveland, Ohio 48th edition), R is a hydrocarbyl group or hydrocarboxy group having from 1 to 20 carbon atoms, X is a halogen, and "m" is a whole number from 1 to 3, "n" is a whole number form 0 to 3, and "q" is a whole number from 0 to 3, $(C_5R'_k)_g R''_s (C_5R'_k) MQ_{3-g}$, and   II.

$R''_s (C_5R=_k)_2 MQ'$   III.

wherein $(C_5R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radicals containing from 1 to 20 carbon atoms, a silicon-containing hydrocarbyl radical, or a hydrocarbyl radical wherein two carbon atoms are joined together to form a $C_4-C_6$ ring, R'' is $C_1-C_4$ alkylene radical, a dialkyl germanium or silicone, or an alkyl phosphine or amine radical bridging two $(C_5R'_k)$ rings, Q is a hydrocarbyl radical such as aryl, alkyl, alkenyl, alkylaryl, or arylalkyl having 1–20 carbon atoms, hydrocarboxy radical having 1–20 carbon atoms or halogen and can be the same or different, Q' is an alkylidene radical having from 1 to about 20 carbon atoms, "s" is 0 or 1, "g" is 0, 1 or 2; when "g" is 0, s is 0; "k" is 4 when "s" is 1 and "k" is 5 when s is 0 and M is as defined above.

Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl, and the like. Exemplary alkylene radicals are methylene, ethylene, propylene, and the like. Exemplary halogen atoms include chlorine, bromine and iodine and of these halogen atoms, chlorine is preferred. Exemplary of the alkylidene radicals is methylidene, ethylidene and propylidene.

Of the metallocenes, zirconocenes, hafnocenes and titanocenes are most preferred. Illustrative but non-limiting examples of these metallocenes which can be usefully employed in accordance with this invention are monocyclopentadienyl titanocenes such as, cyclopentadienyl titanium trichloride, pentamethylcyclopentadienyl titanium trichloride; bis(cyclopentadienyl) titanium diphenyl; the carbene represented by the formula $Cp_2Ti=CH_2\cdot Al(CH_3)_2Cl$ and derivatives of this reagent such as $Cp_2Ti=CH_2\cdot Al(CH_3)_3$, $(Cp_2TiCH_2)_2$, $Cp_2TiCH_2CH(CH_3)CH_2$, $Cp_2TiCH=CH_2CH_2$, $Cp_2Ti=CH_2\cdot AlR'''_2Cl$, wherein Cp is a cyclopentadienyl or substituted cylopentadienyl radical, and R''' is an alkyl, aryl, or alkylaryl radical having from 1–18 carbon atoms; substituted bis(Cp)Ti(IV) compounds such as bis(indenyl)titanium diphenyl or dichloride, bis(methylcyclopentadienyl)titanium diphenyl or dihalides and other dihalide complexes; dialkyl, trialkyl, tetra-alkyl and penta-alkyl cyclopentadienyl titanium compounds such as bis(1,2-dimethylcyclopentadienyl)titanium diphenyl or dichloride, bis(1,2-diethylcyclopentadienyl)Ti diphenyl or dichloride and other dihalide complexes; silicone, phosphine, amine or carbon bridged cyclopentadiene complexes, such as silyldicyclopentadienyl titanium diphenyl or dichloride, methylenedicyclopentadienyl titanium diphenyl or dichloride and other dihalide complexes and the like.

Illustrative but non-limiting examples of the zirconocenes which can be usefully employed in accordance with this invention are, cyclopentadienyl zirconium trichloride, pentamethylcyclopentadienyl- zirconium trichloride, bis(cyclopentadienyl)zirconium diphenyl, bis(cyclopentadienyl)zirconium dichloride, the alkyl substituted cyclopentadienes, such as bis(ethyl cyclopentadienyl)zirconium dimethyl, bis($\beta$-phenylpropylcyclopentadienyl)zirconium dimethyl, bis(methylcyclopentadienyl)zirconium dimethyl, and dihalide complexes of the above; di-alkyl, tri-alkyl, tetra-alkyl, and penta-alkyl cyclopentadienes, such as bis(pentamethylcyclopentadienyl)zirconium dimethyl, bis(1,2-dimethylcyclopentadienyl)zirconium dimethyl, bis(1,3-diethylcyclopentadienyl)zirconium dimethyl and dihalide complexes of the above; silicone, phosphorus, and carbon bridged cyclopentadiene complexes such as dimethylsilyldicyclopentadienyl zirconium dimethyl or dihalide, methylphosphine dicyclopentadienyl zirconium dimethyl or dihalide, and methylene dicyclopentadienyl zirconium dimethyl or dihalide, carbenes represented by the formulae $Cp_2Zr=CH_2P(C_6H_5)_2CH_3$, and derivatives of these compounds such as $Cp_2ZrCH_2CH(CH_3)CH_2$.

Bis(cyclopentadienyl)hafnium dichloride, bis(cyclopentadienyl)hafnium dimethyl, bis(cyclopentadienyl)vanadium dichloride and the like are illustrative of other metallocenes.

Generally the use of a metallocene which comprises a bis(substituted cyclopentadienyl) zirconium will provide a catalyst complex of higher activity than a corresponding titanocene or a mono cyclopentadienyl metal compound. Hence bis(substituted cyclopentadienyl) zirconium compounds are preferred for use as the metallocene.

Heretofore the alumoxane component of the active catalyst complex for systems used in polymerization of olefins has been separately prepared then added as such to a catalyst support material which is then treated with a metallocene to form the active catalyst complex. One procedure heretofore employed for preparing the alumoxane separately is that of contacting water in the form of a moist solvent with a solution of aluminum trialkyl in a suitable organic solvent such as benzene, toluene or less preferably, an aliphatic hydrocarbon. As before noted this procedure is attendant with fire and explosion hazards which requires the use of explosion-proof equipment and carefully controlled reaction conditions. In an alternative method heretofore employed for the separate production of alumoxane, an aluminum alkyl is contacted with a hydrated salt, such as hydrated copper sulfate. The method comprised treating a dilute solution of aluminum alkyl in, for example, toluene, with a copper sulfate pentahydrate. A slow, controlled hydrolysis of the aluminum alkyl to alumoxane results which substantially eliminates the fire and explosion hazard but with the disadvantage of the creation of hazardous waste products that must be disposed of and from which the alumoxane must be separated before it is suitable for use in the production of an active catalyst complex. Separate production of the alumoxane component by either procedure is time consuming and costly. Correspondingly, the use of a separately produced alumoxane greatly increases the cost of producing a metallocene alumoxane catalyst.

In accordance with the present invention the alumoxane component of the catalyst complex is prepared by direct reaction of an aluminum trialkyl with the material utilized as the catalyst support, namely an undehydrated silica gel. Silica useful as the catalyst support is that which has an average particle size less than about $10\mu$, and preferably from about 0.1 to about $10.0\mu$, most preferably from about 4 to about $8\mu$, ($1\mu=10^{-6}m$), a surface area in the range of about 10 to about 700 $m^2/g$, preferably about 100–500 and desirably about 200–400 $m^2/g$, a pore volume of about 3 to about 0.5 cc/g and preferably 2–1 cc/g, and an adsorbed water content of from about 5 to about 20 weight percent, preferably from about 8 to about 15 weight percent. Hereafter, silica having the above identified properties is referred to as undehydrate silica gel.

Undehydrate silica gel, as defined above, is added over time, about a few minutes, to a stirred solution of aluminum trialkyl, preferably trimethyl aluminum or triethyl aluminum, in an amount sufficient to provide a mole ratio of aluminum trialkyl to water of from about 0.5 to 1.5, preferably about 0.8 to 1.2. The solvents used in the preparation of the catalyst system are inert hydrocarbons, in particular a hydrocarbon that is inert with respect to the catalyst system. Such solvents are well known and include, for example, isobutane, butane, pentane, hexane, heptane, octane, cyclohexane, methylcyclohexane, toluene, xylene and the like, however the aliphatic solvents are preferred. Each alkyl group in the aluminum trialkyl preferably contains 1 to 6 carbon atoms. Examples of aluminum trialkyl suitable for use are tripropyl aluminum, tri-n-butyl aluminum, tri-isobutyl aluminum, tri(2-methylpentyl) aluminum, trihexyl aluminum. Also suitable, although less preferred, aluminum trialkyls are tri-n-octyl aluminum and tri-n-decyl aluminum.

Upon addition of the undehydrate silica gel to the solution of aluminum trialkyl, the water content of the silica gel controllably reacts with the aluminum trialkyl to produce an alumoxane which is deposited onto the surface of the silica gel particles. Although the reaction of the aluminum trialkyl with the water content of the silica gel proceeds relatively quickly (generally within about 5 minutes), it does not occur with the explosive quickness of that which occurs with free water. The reaction may be safely conducted in conventional mixing equipment under a mantle of inert gas.

Thereafter a metallocene is added to the stirred suspension of alumoxane silica gel product in an amount sufficient to provide a mole ratio of aluminum to transition metal of from about 1000 to about 1, preferably from about 500 to about 10 and most preferably from about 100 to about 20. The mixture is stirred for about 30 minutes to about one hour at ambient or an elevated temperature of about 75° C. to permit the metallocene to undergo complete complexing reaction with the adsorbed alumoxane.

Following the addition of the metallocene to the alumoxane adsorbed on the silica gel solids, the solvent is removed by filtering or evaporation, and the residual solids are dried to a free-flowing powder. Drying can be accomplished by any means known in the art. The free flowing powder comprises a silica gel supported metallocene alumoxane catalyst complex. The average particle size of the free flowing powder is less than $10\mu$. The dried composition exhibits a high level of catalytic activity useful for high pressure and/or high temperature olefin polymerizations.

The order of addition between the undehydrate silica gel and the aluminum trialkyl is important with regards to the activity of the supported catalyst which results upon addition of the metallocene. A supported catalyst composition of poor activity results wherein an aluminum trialkyl is added to a stirred solvent suspension of undehydrated silica gel. It has been found that to prepare a supported catalyst composition of acceptable or high activity the order of mixing must be one wherein the undehydrated silica gel is added to a stirred solution of the aluminum trialkyl. It is believed that this order of mixing forces the aluminum trialkyl to undergo reaction in the context of a transient localized excess of aluminum trialkyl compared to a transient localized deficiency of water. Under a mixing condition which slowly adds undehydrated silica gel to a stirred solution of aluminum trialkyl, the bulk content of the aluminum trialkyl converts to an alumoxane with a degree of oligomerization of about 6–25 (y=6–25). Production of an alumoxane with this degree of oligomerization results in a final metallocene alumoxane catalyst complex of useful or high activity. A reverse order of mixing, that is, addition of an aluminum trialkyl to a stirred solvent suspension of undehydrated silica gel yields a catalyst which has a poor degree of catalytic activity.

In addition to the importance of proper mixing order in achieving a supported catalyst of useful activity, it has also been observed that the water content of the undehydrated silica gel influences final catalyst activity. Hence the undehydrated silica gel should have an adsorbed water content of from about 5 to about 20 weight percent. Preferably the adsorbed water content should be from about 8 to about 15 weight percent. Maximum catalyst activity for a given metallocene component is generally observed wherein the adsorbed water content of the undehydrated silica gel used as a support is from about 8.0 to about 15.0 weight percent.

Further influencing the degree of activity attained in the final supported catalyst complex is the mole ratio of aluminum trialkyl to the adsorbed water content of the undehydrated silica gel. The quantities of aluminum trialkyl employed should, in comparison to the quantity of undehydrated silica gel of specified adsorbed water content, be selected to provide a mole ratio of aluminum trialkyl to water of from about 0.5 to about 1.5, preferably from about 0.8 to about 1.2. It has been observed that for a given metallocene, a maximum catalyst activity is generally observed in the aluminum trialkyl to water mole ratio range of about 0.8 to about 1.2, depending upon the particular aluminum trialkyl selected for use.

Also influencing the cost of production and the level of catalytic activity obtained in the final supported catalyst complex is the mole ratio of aluminum to transition metal of the metallocene component. The quantity of metallocene added to the alumoxane adsorbed silica gel solids should be selected to provide an aluminum to transition metal mole ratio of from about 1000 to about 1, preferably from about 500 to about 10, and most preferably from about 100 to about 20. From the standpoint of economic considerations it is desirable to operate in the lower ranges of the aluminum to transition metal mole ratio in order to minimize the cost of catalyst production. The procedure of this invention is one which provides the maximum conversion of the aluminum trialkyl component to the most efficacious form of alumoxane, hence permits the safe production of a supported metallocene alumoxane catalyst of useful activity with low quantities of the costly aluminum trialkyl component.

By appropriate selection of the type and relative amounts of the metallocene and the aluminum trialkyl cocatalyst precursor, one can attain by the present method the particular active catalyst complex desired for any application. For example, higher concentrations of alumoxane in the catalyst system generally result in higher molecular weight polymer product. Therefore, when it is desired to produce a high molecular weight polymer a higher concentration of aluminum trialkyl is used, relative to the metallocene, than when it is desired to produce a lower molecular weight material. For most applications the ratio of aluminum in the aluminum alkyl to total metal in the metallocene can be in the range of from about 500 to about 10, and preferably about 100 to about 20.

In polymerization of olefins, hydrogen is often employed in order to control the desired molecular weight of the polymeric end product. Unfortunately, hydrogen has a destructive effect on the carbon lined walls of the reactors used in high pressure and/or high temperature polymerization. It has been discovered that the molecular weight of the desired polymeric product can be controlled with the catalyst complex of this invention by monitoring the temperature in the reactor. In particular, a direct linear relationship exists between the molecular weight of the polymer obtained from the catalyst complex of this invention and the reactor temperature. The molecular weight of the polymer decreases with an increase in reactor temperature.

The molecular weight of the polymer product can also be controlled by the judicious selection of substituents on the cyclopentadienyl ring and use of ligands for the metallocene. Further, the comonomer content can be controlled by the judicious selection of the metallocene. Hence, by the selection of catalyst components it is possible to tailor the polymer product with respect to molecular weight and density.

The dried, free flowing powder, prior to feeding into the catalyst feeding pump of the reactor, is added to an inert solvent, for example, hydrocarbon solvents such as hexane or heptane, to form a slurry. As stated above, it is essential that the settling rate of the catalyst in the hydrocarbon slurry be very slow relative to the flow rate through the catalyst lines feeding the high pressure reactor since a high settling rate results in plugging of the line and erratic feeding. The catalyst complex of this invention of small particle size eliminates all concerns regarding settling and results in a stable suspension of catalyst.

The polymers prepared with the catalyst complex and by the method of this invention are homopolymers of ethylene and copolymers of ethylene with higher alpha-olefins having from 3 to about 18 carbon atoms and preferably 4 to 8 carbon atoms. Illustrative of the higher alpha-olefins are butene-1, hexene-1, and octene-1. Elastomers can also be prepared by copolymerizing ethylene and dienes, preferably those having up to 10 carbon atoms. The polymerization is normally conducted under temperatures from about 100° C. to about 300° C. and pressures of about 10,000 to about 30,000 psig.

EXAMPLE 1

Undehydrated silica gel was employed in accordance with the procedure of this invention to prepare a silica gel supported bis(n-butylcyclopentadienyl)zirconium dichloride ($[nBuCp]_2ZrCl_2$)-methyl alumoxane catalyst complex, as follows:

A 1 liter three neck flask equipped with a magnetic stirring bar was charged with 200 ml of dried and degassed heptane.

One hundred-thirty (130) milliliters of trimethylaluminum/heptane solution (1.6 M) heptane was then charged into the flask. Thereafter 55 g of undehydrated silica gel (Davison Syloid 221 with average particle size of 6.5μ) which contains 7.2 weight percent water was added slowly into the flask through a solids addition vessel. The resulting mixture was allowed to react under stirring at room temperature for 1 hour. Thereafter 1.25 g of bis(n-butylcyclopentadienyl) zirconium dichloride ([nBuCp]$_2$ZrCl$_2$) dissolved in 120 ml heptane was injected into the flask and the resulting mixture was allowed to react at room temperature under stirring for 30 minutes. The volatile solvent was then removed by nitrogen purging while the flask was heated to a drying temperature of 75° C. in an oil bath until the contents of the flask became solid. The mixture was then dried to a free flowing powder by vacuum drying at ambient temperature.

EXAMPLE 2

The procedure of Example 1 was followed with the exception that 52 g undehydrated silica gel (Davison Syloid 221 with average particle size of 6.5μ) was added.

EXAMPLE 3

The procedure of Example 1 was followed with the exception that 54 g undehydrated silica gel (Davison Syloid 221 with average particle size of 6.5μ) was added.

EXAMPLE 4

The procedure of Example 1 was followed with the exception that one hundred-thirty (130) milliliters of triethylaluminum/heptane solution (1.54M) was charged to the flask and the drying temperature was 55° C.

EXAMPLE 5

The procedure of Example 4 was followed with the exception that 57 g undehydrated silica gel (Davison Syloid 221 with average particle size of 6.5μ) was added.

EXAMPLE 6

The procedure of Example 5 was followed with the exception that the drying temperature was 80° C.

CATALYST TEST A

The activity of the catalyst powders of Examples 1 to 6 were determined at ambient temperature and ethylene gas pressure of 5 psig by the following procedure. A 150 milliliter vial was freshly cleaned, heated to 130° C. for 6 hours, cooled to room temperature and flushed with nitrogen for 10 minutes. The vial was provided with a magnetic stirring bar and 2.5 grams of catalyst composition was charged into the vial. At ambient temperature ethylene gas was fed into the vial. Polymerization of the ethylene was allowed to proceed for 30 minutes. The yield of polyethylene obtained with each catalyst composition is reported in Table I.

TABLE I

CATALYST TEST RESULT

| Catalyst | | Pressure (psig) | Amount Polyethylene Formed, g |
|---|---|---|---|
| Example | 1 | 0 | 2.2 |
| | 2 | 0 | 2.1 |
| | 3 | 0 | 2.0 |
| | 3 | 5 | 3.3 |
| | 4 | 5 | 1.5 |
| | 5 | 5 | 1.6 |
| | 6 | 5 | 1.0 |

EXAMPLE 7

The procedure of Example 4 was followed with the exception that 50 g undehydrated silica gel (Crosfield Chemicals HP-34 with average particle size of 4.0μ) which contains 8.1 weight percent water was added and 1.25 g of [n-BuCp]$_2$ZrCl$_2$ dissolved in 120 ml heptane was reacted with 5 ml of trimethylaluminum/heptane solution (1.6M) before it was added into the flask.

CATALYST TEST B

The activity of the catalyst of Example 7 was determined in a 1000 ml steel autoclave reaction vessel which was equipped to perform continuous polymerization at pressure up to 36,000 psi and temperature up to 300° C. The reaction system was supplied with a thermalcouple and pressure transducer to measure temperature and pressure continuously, and with means to supply continuously purified compressed ethylene, hydrogen, and 1-butene. Equipment for continuously introducing a measured flow of catalyst solution and equipment for rapidly venting and quenching the reaction and of collecting the polymer product were also a part of the reaction system. In this Example, the polymerization was performed with a molar ratio of ethylene to 1-butene of 1.8 without the addition of a solvent. In this Example, the temperature of the cleaned reactor containing ethylene and 1-butene was equilibrated at the desired reaction temperature of 180° C. The catalyst solution was prepared by mixing 102 g of solid catalyst with 5.0 liter of heptane solvent and 0.5 liter of 2 wt. % methylalumoxane in toluene solution. This catalyst solution was continuously fed by a high pressure pump into the reactor at a rate of 540 ml/hour which resulted in a temperature of 180° C. in the reactor. During this run, ethylene and 1-butene were pressured into the autoclave at a total pressure of 19,000 psi at a mass flow rate of 36.2 kg/hour. The reactor contents were stirred at 1000 rpm. The yield of polymer product was 3.2 kg/hour of an ethylene-1-butene copolymer which had weight average molecular weight of 46,900, a polydispersity of 2.3 and a density of 0.9190 g/ml.

Although the preferred embodiments of the invention have been described, upon reading this description one of ordinary skill in the art may appreciate changes and modifications which may be made which do not depart from the scope and spirit of the invention as described above or claimed hereafter.

I claim:

1. A supported metallocene alumoxane catalyst complex for the polymerization of olefins under high pressure, produced by:
   (a) adding a undehydrated silica gel having a particle size less than 10μ to a stirred solution of an aluminum trialkyl in an amount sufficient to provide a mole ratio of aluminum trialkyl to water of from about 0.5 to about 1.5 and allowing the mixture to react;
   (b) adding a metallocene to the reacted mixture;
   (c) removing the solvent; and
   (d) drying the solids to form a free flowing powder.

2. The catalyst of claim 1, wherein said undehydrated silica gel has a water content of from about 5 to about 20 weight percent.

3. The catalyst of claim 1, wherein the mole ratio of aluminum to transition metal in said metallocene is from about 1000:1 to about 1:1.

4. The catalyst of claim 2, wherein said undehydrated silica gel has a water content of from about 5 to about 20 weight percent and the mole ratio of aluminum trialkyl to water is from about 0:8 to about 1:2.

5. The catalyst of claim 4, wherein the mole ratio of aluminum to transition metal in said metallocene is from about 500:1 to about 10:1.

6. The catalyst of claim 5, wherein the aluminum trialkyl is trimethyl aluminum or triethyl aluminum.

7. The catalyst of claim 6, wherein said undehydrated silica gel has a water content of from about 8.0 to about 15.0 weight percent.

8. The catalyst of claim 7, wherein said undehydrated silica gel has a surface area of from about 200 to about 400 m²/g, a pore volume of from about 1 to about 2 cc/g.

9. The catalyst of claim 8, wherein the mole ratio of aluminum to transition metal in said metallocene is from about 100:1 to about 20:1.

10. The catalyst of claim 1, wherein said metallocene is selected from the group consisting of:
   (a) $(Cp)_m MR_n X_q$ wherein Cp is a cyclopentadienyl ring, M is a Group 4b or 5b transition metal, R is a hydrocarbyl group or hydrocarboxy group having from 1 to 20 carbon atoms, X is a halogen, and m is a whole number from 1 to 3, n is a whole number from 0 to 3, and q is a whole number from 0 to 3;
   (b) $(C_5R'_k)_g R''_s (C_5R'_k) MQ_{3-g}$; and
   (c) $R''_s (C_5R'_k)_2 MQ'$
wherein $(C_5R'_k)$ is a cyclopentadienyl or substituted cyclopentadienyl, each R' is the same or different and is hydrogen or a hydrocarbyl radical containing from 1 to 20 carbon atoms, a silicon-containing hydrocarbyl radical, or a hydrocarbyl radical wherein two carbon atoms are joined together to form a $C_4$-$C_6$ ring, R" is $C_1$-$C_4$ alkylene radical, a dialkyl germanium or silicone, or an alkyl phosphine or amine radical bridging two $(C_5R'_k)$ rings, Q is a hydrocarbyl radical having 1-20 carbon atoms, hydrocarboxy radical having 1-20 carbon atoms or halogen and can be the same or different, Q' is an alkylidene radical having from 1 to about 20 carbon atoms, s is 0 or 1, g is 0, 1 or 2; when g is 0, s is 0; k is 4 when s is 1 and k is 5 when s is 0 and M is as defined above.

11. The catalyst of claim 10 wherein said metallocene is zirconocene, hafnocene or titanocene.

12. The catalyst of claim 11, wherein said zirconocene is selected from the group consisting of cyclopentadienyl zirconium trichloride; pentamethylcyclopentadienyl zirconium trichloride; bis(cyclopentadienyl)zirconium diphenyl; bis(cyclopentadienyl)zirconium dichloride; alkyl substituted cyclopentadienes, and their dihalide complexes; dialkyl, trialkyl, tetra-alkyl, and penta-alkyl cyclopentadienes, and their dihalide complexes; and silicone, phosphorus, and carbon bridged cyclopentadiene complexes.

* * * * *